UNITED STATES PATENT OFFICE.

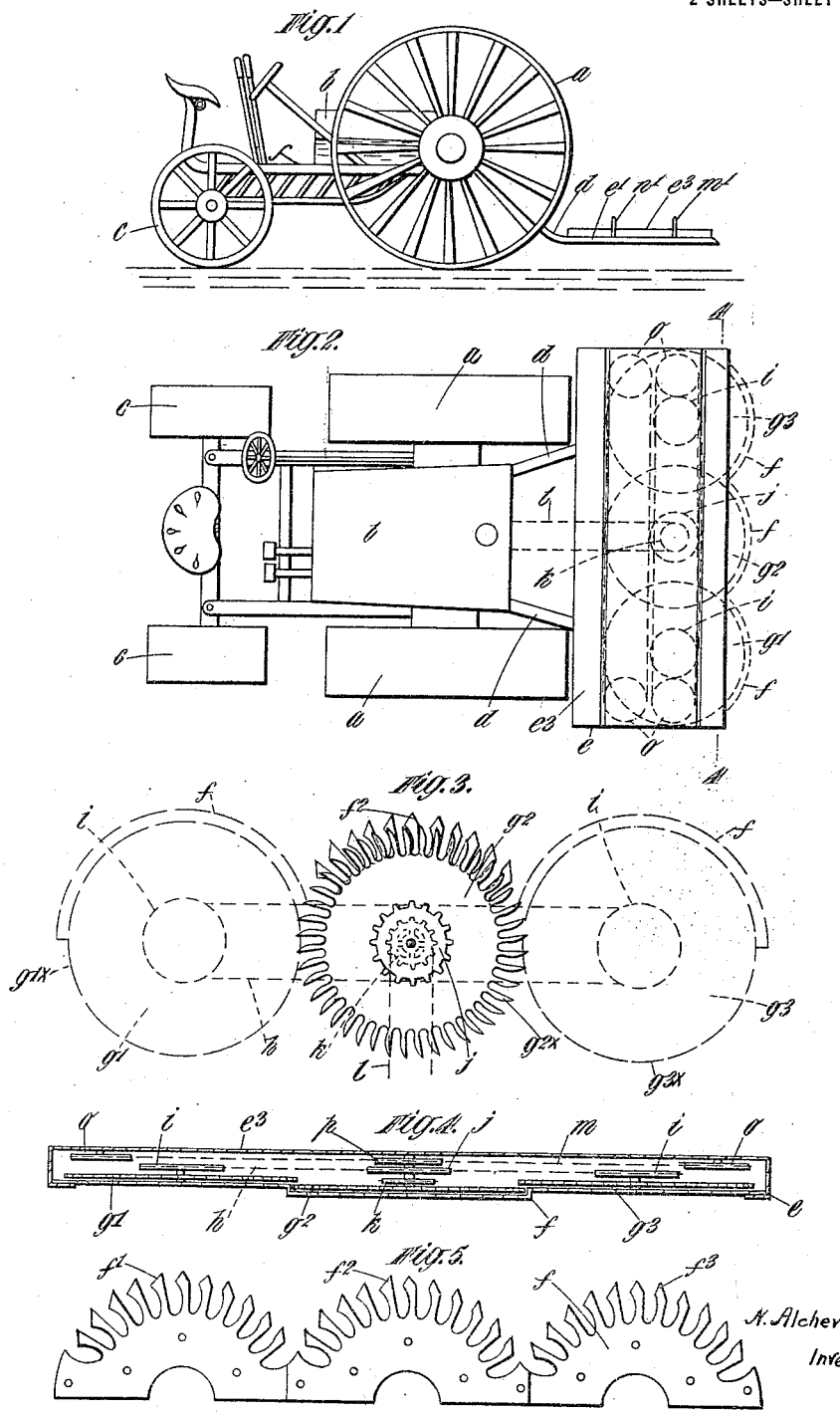

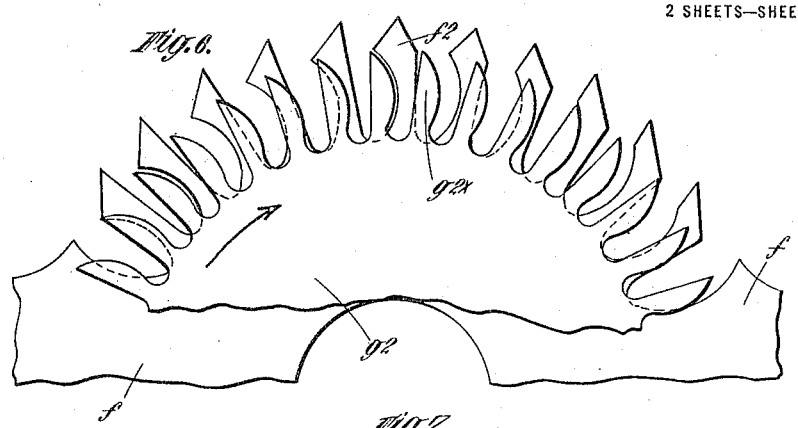
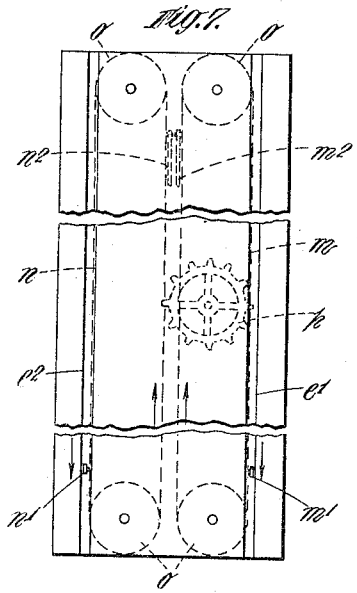
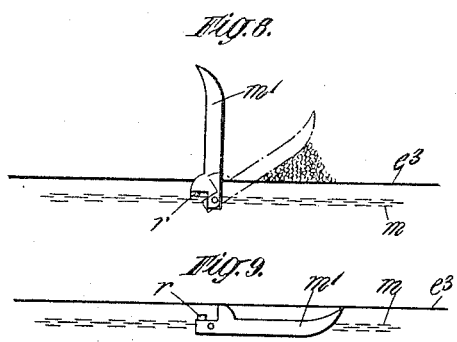

NAOUM ALCHEVSKY, OF HOLBORN, ENGLAND.

MACHINE FOR CUTTING CROPS.

1,206,642.

Specification of Letters Patent.   Patented Nov. 28, 1916.

Application filed April 18, 1916.   Serial No. 92,031.

*To all whom it may concern:*

Be it known that I, NAOUM ALCHEVSKY, a subject of the Czar of Russia, residing at 6 Coram street, Holborn, in the county of London, England, have invented certain new and useful Improvements in Machines for Cutting Crops, of which the following is a specification.

This invention relates to machines for cutting crops and more particularly to machines of the kind in which rotary wheels having peripheral cutting teeth or blades coöperate with a fixed comb or a stationary toothed bar or plate.

The chief object of the present invention is to provide a machine of the above stated kind which is especially suitable for cutting standing crops of rice, papyrus, or other similar crops.

According to this invention the machine is provided with movable or rotary cutters which coöperate with a fixed comb, as heretofore, but the teeth or blades of the movable cutters and those of the fixed comb are so shaped that their coöperating or cutting edges are parallel to each other when effecting the cutting action. The coöperating teeth of the cutters and the comb are preferably similar in shape to the cutting blades of a gardener's "secateur" or pruning shears that is to say the teeth on the cutters are formed with outwardly curved cutting edges, and the teeth on the fixed comb are formed with inwardly curved cutting edges. The arrangement according to the present invention however differs from the gardener's secateur as in the latter the curved cutting edges of the blades are not parallel at the moment of cutting. The machine is preferably driven or propelled by a petrol motor from which motion is derived to rotate say three cutting wheels and also to actuate a rake or similar mechanism which removes the cut crops from the machine.

In order that the invention may be clearly understood and readily carried into effect the same will now be described more fully with reference to the accompanying drawings, in which:—

Figures 1 and 2 are a side elevation and a plan respectively showing diagrammatically one construction of the improved machine which is especially designed for cutting crops of rice or papyrus. Fig. 3 is a diagrammatic plan of rotary cutting wheels and the fixed comb, showing the means for rotating the cutting wheels. Fig. 4 is a transverse sectional view taken approximately on the line 4—4 of Fig. 2 but drawn to a larger scale. Fig. 5 is a plan of the fixed comb. Fig. 6 is an enlarged view of some of the teeth of one of the cutting wheels and the adjacent portion of the fixed comb. Fig. 7 is a diagrammatic plan of one form of the aforesaid rake mechanism. Figs. 8 and 9 are detail views of one of the rake teeth.

In the example shown the machine comprises a pair of front road wheels $a$ $a$ which are driven by a petrol motor $b$ mounted on the chassis, and a pair of rear wheels $c$, $c$. At the forward end of the machine, two brackets $d$, $d$ extend from the chassis and support a transverse frame $e$ of rectangular shape a short distance above the ground. This frame $e$ carries the fixed comb $f$ and also the three rotating cutting wheels $g'$, $g^2$, $g^3$ which are disposed immediately above the fixed comb. The fixed comb $f$ which is in the form of a thin transverse plate that is adapted to be bolted to the frame $e$ is provided with three arcuate or curved portions each having specially shaped radial teeth $f'$, $f^2$, $f^3$ (see Fig. 5). The cutting wheels $g'$, $g^2$, $g^3$ are composed of thin or sheet metal and are provided with a number of specially shaped radial teeth $g'^x$ $g^{2x}$, $g^{3x}$ respectively around their peripheries, the wheels being so disposed with relation to the fixed comb $f$ that the peripheral teeth of the wheels $g'$, $g^2$, $g^3$ coöperate with the teeth $f'$, $f^2$, $f^3$ of the comb respectively. It will be seen from Fig. 4 that the fixed comb $f$ is recessed at its middle portion to receive the middle cutting wheel $g^2$ which lies below the cutting wheels $g'$, $g^3$. The cutting wheels $g'$, $g^2$, $g^3$ are rotated in the same direction by means of a sprocket chain $h$ passing around sprocket wheels $i$ $i$ secured on or to the end or outer cutting wheels $g'$, $g^3$ and engaging with a sprocket wheel $j$ secured on or to the middle cutting wheel $g^2$ the latter sprocket wheel being driven or rotated by a smaller sprocket wheel $k$ (which will be hereinafter referred to as a power wheel) connected thereto and rotated by a sprocket chain $l$ that derives its motion from the engine (see Figs. 2 and 3). The frame $e$ is provided with a top or cover plate $e^3$ which extends over the aforesaid sprocket gearing and also the rake mechanism as hereinafter described.

The teeth on the rotating cutting wheels $g'$, $g^2$, $g^3$ are of similar formation and as shown in Figs. 3 and 6, each tooth being provided with an outwardly curved cutting edge. The three sets of radial teeth $f'$, $f^2$, $f^3$ provided on the curved or arcuate portions of the comb $f$ are similar but no two teeth of any of the sets $f'$, $f^2$, $f^3$ are quite alike owing to the teeth of each set being positioned radially and shaped to form pointed ends that extend all in the same direction so as to guide the stems of the standing crops between the teeth of the fixed comb into the path of the teeth of the rotating cutting wheels as the machine travels forward (see Figs. 3, 5, and 6). Each tooth of any of the sets $f'$ $f^2$ $f^3$ is formed with an inwardly curved edge (which may be sharp or blunt but preferably blunt) and is successively met by the curved cutting edge of each tooth of the corresponding cutting wheel, so that the two curved edges of the cutting wheel teeth and the fixed comb teeth coöperate and effect the cutting or shearing action. The teeth on the fixed comb are so positioned relatively to the teeth on the cutting wheels, and the curvature of the cutting or coöperating edges of both the fixed and moving teeth is such that the cutting edges of the teeth on the cutting wheel will be parallel to any of the curved edges of the fixed teeth at the moment of the cutting action taking place. By means of this construction or formation of the teeth a very effective cutting action is produced thereby rendering the machine especially suitable for cutting crops of rice, papyrus and similar crops.

As the crops are cut they fall on to the cover plate $e^3$ of the frame $e$ from which they are removed by the aforesaid rake mechanism which displaces the crops across the frame and deposits the same on the ground at the side of the machine as the latter travels along. The rake mechanism comprises two endless sprocket chains $m$ $n$ carrying teeth $m'$, $m^2$, $n'$, $n^2$ and passing around sprocket wheels $o$, $o$ situated at the ends of the frame $e$ and so arranged that the chains are parallel to each other, the said chains being driven by a sprocket wheel $p$ which engages with both the chains $m$ $n$ as shown in Fig. 7 and which being on the same axis or spindle as the sprocket wheel $j$ and power wheel $k$ is rotated by the said power wheel $k$ that derives its motion from the engine through the sprocket chain $l$. (See Fig. 4). It will be understood that one lead of a chain, such as $m$, may pass over the wheel $p$.

The rake teeth $m'$, $n'$, $m^2$, $n^2$ are hinged or pivoted to the sides of the chains $m$ $n$ and they travel vertically across the frame in parallel transverse slots $e'$ $e^2$ in the cover plate $e^3$ the said rake teeth being so constructed and arranged that after traveling vertically across the frame they are caused by gravity, or any suitable means not shown, to assume an inoperative or horizontal position so as to travel under the cover plate $e^3$ back to the commencement of the aforesaid slots $e'$ $e^2$. While the rake teeth $m'$, $n'$ move across the frame vertically in the same plane to remove the cut crops from the machine the other pair $m^2$, $n^2$ is returning under the cover plate $e^3$ in an inoperative or horizontal position. The teeth are so shaped as to engage with projections $r$ on the chains to maintain the teeth vertical (see Figs. 8 and 9) and they are adapted to be guided in any appropriate manner from their horizontal positions to the vertical positions. This movement or change of position may be assisted by providing the teeth with rounded or curved ends by means of which the teeth on meeting the cut crops on the cover plate $e^3$ are gradually raised to the vertical or operative position owing to the resistance offered by the crops to the transverse movement of the teeth (see Fig. 8).

What I claim and desire to secure by Letters Patent of the United States is:—

1. A crop cutting machine comprising a fixed comb having a plurality of teeth provided with curved cutting edges and a movable cutter having a plurality of teeth provided with curved cutting edges, the cutting edges of the teeth of the comb and those of the cutter being so shaped that they are parallel with each other when effecting the cutting action.

2. A crop cutting machine comprising a fixed comb having a plurality of curved portions which are provided with cutter teeth radially arranged thereon, and a rotating cutting wheel for each curved portion of the fixed comb, the said cutting wheels having teeth provided with curved cutting edges which are positioned parallel to the cutting portions of the fixed comb teeth when effecting the cutting action.

3. A crop cutting machine comprising rotary cutting wheels having radial teeth, a fixed comb having semi-circular portions on which are provided radial teeth which point generally in the direction of travel of the machine whereby standing crops may be guided into the path of the cutting teeth, the cutting edges of the teeth on the wheels and the fixed comb being parallel to each other when effecting the cutting action.

4. In a crop cutting machine, a fixed semi-circular comb having a series of radiating teeth including a centrally positioned tooth, the teeth on each side of the central tooth having angular pointed ends, said teeth being of different form the angle at the vertex at the ends of the teeth being reduced gradually away from the central tooth, each of said teeth having a concave cutting edge of substantially the same formation, and a rotary cutter having teeth semi-ovate in form to produce convex cutting edges, the convex cutting edge of each tooth of the rotary cutter coöperating with the concave cutting edge of each tooth of the comb so that the coöperating teeth will cut throughout their length at the same instant.

5. In a crop cutting machine, a plurality of rotatable cutters each having a sprocket wheel, an endless sprocket chain for engagement with a plurality of said sprocket wheels, rake mechanism coöperating with the cutters, said rake mechanism including a plurality of endless sprocket chains each of which pass over a plurality of end sprocket wheels of the rake mechanism, a power wheel having a shaft movable therewith, said shaft having a sprocket wheel to engage the cutter sprocket chain, and another sprocket wheel which engages a plurality of rake mechanism sprocket chains.

6. A crop cutting machine including rake mechanism mounted upon a frame of the machine, said rake mechanism comprising a plurality of sets of sprocket wheels and a plurality of endless sprocket chains each passing over a set of sprocket wheels, a centrally positioned toothed sprocket serving as an actuating wheel which engages adjacent leads of a plurality of sprocket chains to drive the chains at substantially the same speed, and pivoted rake teeth mounted on said sprocket chains and having means to retain the teeth in a vertical position when traveling horizontally across the frame in one direction to remove material which may be deposited on the frame, said rake teeth traveling in a substantially horizontal position when moving in the opposite direction.

7. A crop cutting machine comprising a frame having material guiding means and cutting devices, means to transmit power to the cutting devices including a centrally positioned shaft having a plurality of sprocket wheels and a power wheel, a plurality of sprocket wheels positioned near the ends of the frame, and a plurality of endless chains coöperating with said end wheels, said endless chains being simultaneously actuated by a centrally positioned sprocket wheel at a speed proportional to that of the cutting devices, and pivoted rake teeth on said sprocket chains which move in a substantially vertical position when traveling horizontally across the frame in a direction to move material guided to the frame and severed by the cutting devices, and move in a substantially horizontal position across the frame in the opposite direction.

8. In a crop cutting machine, a frame having a centrally positioned power transmitting mechanism, including a sprocket wheel, rotatory material cutting devices carried by the frame and actuated by means connected with the central power transmitting mechanism, and conveying means carried by the frame to remove the material so severed to one side of the frame, said conveying means comprising a plurality of endless chains, sprocket wheels for said chains oppositely positioned on the frame, said centrally positioned sprocket wheel of the power mechanism simultaneously engaging a plurality of said chains to move the same at a speed proportional to the movement of the cutting devices, said conveying means including rake teeth pivotally mounted on the endless chain.

9. In a crop cutting machine, an elongated and slotted frame having a toothed actuating wheel mounted substantially centrally of the length of the frame, means to rotate the actuating wheel, a plurality of sprocket wheels oppositely positioned on the frame, a plurality of endless sprocket chains mounted in parallel relation on the frame passing over said sprocket wheels, said sprocket chains having pivotally mounted rakes which are moved to substantially vertical position to ride in the slots of the frame when drawn in one direction across the frame, each of the sprocket chains having one lead thereof engaged by the toothed actuating wheel to actuate the plurality of chains whereby the rake teeth of the plurality of chains will coöperate to discharge material from the frame to the same side of the machine.

10. For use in a crop cutting machine, a fixed comb having a plurality of approximately semi-circular portions and radial teeth on said portions which teeth are provided with curved cutting edges and with pointed ends which extend all in the same direction, in combination with a rotatable cutter having curved cutting edges positioned parallel with the cutting edges of said teeth.

11. In a crop cutting machine, a fixed semi-circular comb having a series of radiating teeth including a centrally positioned tooth, the teeth on each side of the central tooth having angular pointed ends, the angle at the ends of each of said teeth being gradually reduced as the teeth are positioned away from the central tooth, each of said teeth having concave cutting edges of substantially the same formation to coöperate with a convex cutting edge of a movable cutter.

NAOUM ALCHEVSKY.